United States Patent [19]

Ghommidh et al.

[11] Patent Number: 4,687,668
[45] Date of Patent: Aug. 18, 1987

[54] CONTINUOUS MICROBIOLOGICAL PRODUCTION OF ACETIC ACID AND VINEGAR

[75] Inventors: Charles Ghommidh; Jean-Marie Navarro, both of Montpellier; Philippe Girardon; Jean Amen, both of Versailles, all of France

[73] Assignee: L'Air Liquide, Societe Anonyme pour l'Etude et l'Exploitation des Procedes Georges Claude, Paris, France

[21] Appl. No.: 796,781

[22] Filed: Nov. 12, 1985

[30] Foreign Application Priority Data

Nov. 13, 1984 [FR] France .............................. 84 17235

[51] Int. Cl.$^4$ ........................... C12J 1/00; C12P 7/54
[52] U.S. Cl. .................................... 426/17; 426/312; 426/474; 435/140; 435/818
[58] Field of Search ................. 426/17, 312, 474, 475; 435/140, 818

[56] References Cited

U.S. PATENT DOCUMENTS

| 61,978 | 2/1867 | Witbeck ................................ 426/17 |
| 181,999 | 9/1876 | Tait . |
| 1,732,921 | 3/1926 | Bratton . |
| 2,707,683 | 5/1955 | Hromatka . |
| 4,463,019 | 7/1984 | Okuhara . |

Primary Examiner—Raymond N. Jones
Assistant Examiner—Marianne M. Cintins
Attorney, Agent, or Firm—Browdy and Neimark

[57] ABSTRACT

Process for continuous production of vinegar by microbiological conversion with oxygen enrichment of ethanol into acetic acid. In a first phase, the micro-biological conversion of ethanol into acetic acid is performed in the presence of air. After consumption of the oxygen in the air, in a second phase, the addition of oxygen, controlled by the demand of the system, is provided by injection of pure oxygen, the aeration gas being recycled, and the gas mixture expelled as soon as the carbon dioxide content reaches the threshold of 7%. After closing of the recycling circuit, the superoxygenated atmosphere is reconstituted with pure oxygen.

18 Claims, 1 Drawing Figure

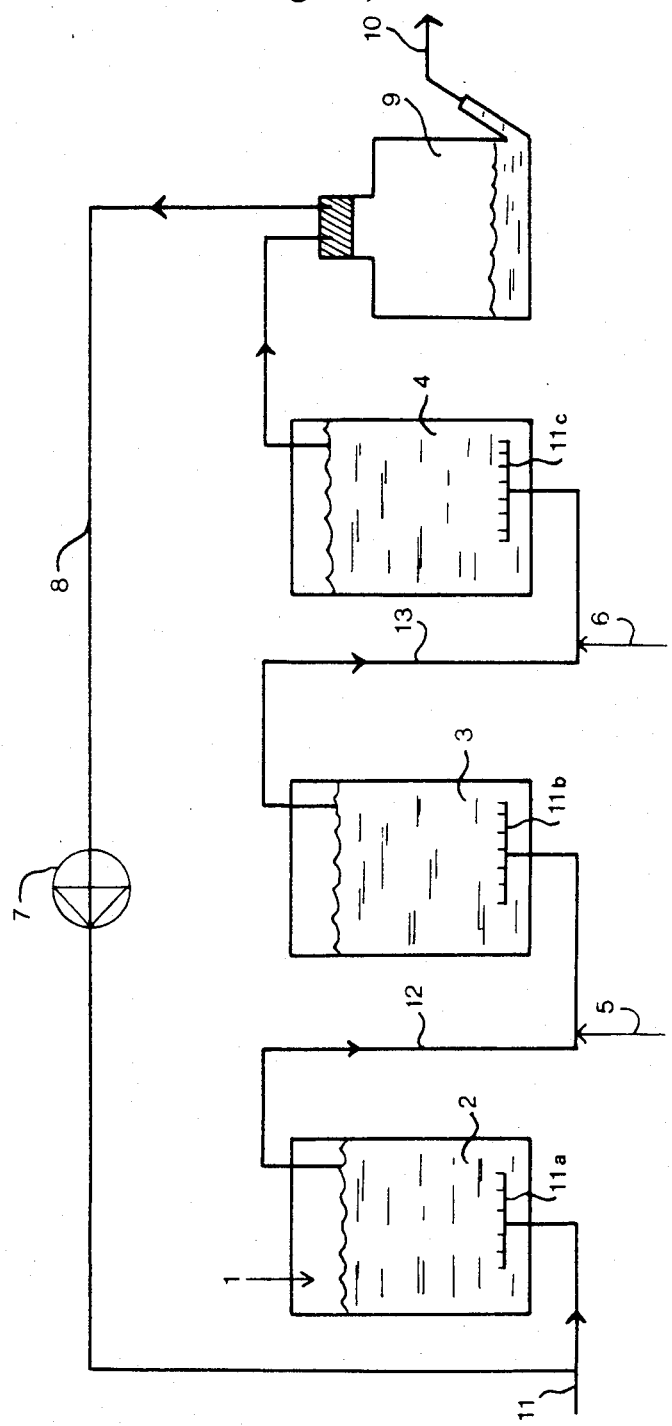

CONTINUOUS MICROBIOLOGICAL PRODUCTION OF ACETIC ACID AND VINEGAR

BACKGROUND OF THE INVENTION

This invention relates to continuous production of vinegar resulting from the microbiological conversion of ethanol into acetic acid.

The method currently used consists of fermentation in immersed culture, with strong aeration by air. Ethanol, of microbiological or chemical origin, is converted by acetic fermentation in the presence of microorganisms of the Acetobacter type, according to the reaction:

$$C_2H_5OH + O_2 \rightarrow CH_3COOH + H_2O$$

into vinegars of wine, alcohol, cider, malt, milk, etc . . .

Around 1950, HROMATKA found that during the preparation of vinegar in immersed culture, the consumption of oxygen was able to reach 7.75 liters per dry-weight gram of bacteria per hour. According to U.S. Pat. No. 2,707,683, the addition of oxygen necessary for bacteria is performed by insufflation of air during fermentation.

In general, acetic fermentation is performed primarily semi-continuously and sometimes continuously.

The use of oxygen enriched air has been described in French Pat. No. 2,331,616.

Industrially, in the present state of the art, only fermentation where desired metabolite is known as primary, can be performed continuously. This process exhibits the advantage of a gain in productivity due particularly to the absence of time losses at filling, bleeding, cleaning of fermenting rooms and phases of latency and exponential multiplication of the microrganisms, In the case of production of acetic acid, the productivity reached is on the order of 1.4 g/l.hr.

However, this process is limited by an insufficient aeration resulting from a lack of oxygen available in the dissolved state of the reactor, and by the inhibition of the growth of the microorganisms due to the substrate, with an alcohol base from 30 g/l, and by the acetic acid produced inhibiting product of the growth at least partially, regardless of its concentration, and totally beyond 80 g/l.

Moreover, the techniques of batch production of acetic acid have productivities depending on the processes, equal to 1 to 1.5 g/l.h for immersed cultures, and 0.25 g/l.h for the cultures with trickling over chips.

Oxygen enrichment of these two main processes at best makes it possible only to double the respective productivities. The arguments of the performances are reflected by a shortening of the time of the cycles.

Additionally, the standard techniques for continuous production of vinegar with oxygen enrichment make it possible to obtain 2 g of acid per liter per hour.

Further, only a rise in the partial pressure of oxygen in the aeration gas could lift the limitation due to oxygen, because a rise in the gas flow would bring out an evaporation of substrate and product produced. A packing that fills the reactor cannot be considered because it would oppose the transfer of oxygen. In addition, the use of naturally flocculant strains does not add any stability during the hydrodynamic flowing.

SUMMARY OF THE INVENTION

An aerobic fermentation process has been sought with high cellular density leading to the production of acetic acid with a very high oxygen efficiency, and without risk of inhibition of the production of the primary metabolite by the carbon dioxide released during fermentation.

The means used in the improved process increase the number of microorganisms in the fermentation medium by enriching the air with pure oxygen, by recycling the aeration gases, to avoid losses of the volatile substrate and oxygen, and by the optimizing continuous addition of substrate.

BRIEF DESCRIPTION OF THE DRAWING

The sole FIGURE schematically illustrates a preferred embodiment of an apparatus used for carrying out the method of the present invention.

DETAILED DESCRIPTION OF THE PREFERRED EMBODIMENT

According to the process, in a first phase, the microbiological conversion of ethanol into acetic acid is performed in the presence of air. After consumption of the oxygen in the air, in the second phase, the addition of oxygen, controlled by the demand of the system, is provided by injection of pure oxygen, the aeration gas then being recycled, and the gas mixture in recirculation expelled as soon as the carbon dioxide content reaches a threshold of 7%. After closing of the recycling circuit, the super-oxygenated atmosphere is reconstituted by pure oxygen until the following degassing.

Recycling of the aeration gas can be partial or total. With a total recycling of the aeration gas, the efficiency of oxygen usage is 99.5%.

The addition of oxygen is controlled by the detection of the partial vacuum of the system or by measurement of the dissolved oxygen, the set point being fixed at the value of saturation in relation to the air.

Despite the slight production of carbon dioxide released during the fermentation, the opening of the system is performed as soon as the carbon dioxide content reaches the threshold of 7% to avoid any toxic effect from it; this level is automatically controlled on the effluent. After closing of the recycling circuit, the superoxygenated atmosphere is reconstituted until the following purge. This superoxygenated atmosphere can contain up to 50% oxygen.

It is advantageous to proceed to a succession of at least two fermentation stages performed in at least two separate fermentation stages with at least an additional supply of substrate.

Performing the continuous process in several successive fermentation stages makes possible the gradual enrichment of the fermentation medium in acetic acid up to at least 100 to 120 grams per liter in the case of three or four fermentation stages. When it is desired to reach high production levels, i.e., greater than 120 g/l of acetic acid, it is advantageous to proceed to additional feeds between the various fermentation stages.

The dilution level of the substrate has an influence on the maximum rate or production of acetic acid. This level advantageously can be between 0.014 and 0.06 $h^{-1}$ for a single-stage system; for a two-stage system this level can change from 0.01 to 0.1 $h^{-1}$, and in a three-stage system it can be between 0.01 to 0.122, for an alcohol substrate of 100 g/l. The alcohol concentration of the supply of substrate can be between about 60 g/l and about 100 g/l.

Considerable aerations of each fermentation stage, 0.8 to 1 volume of air per volume of the medium per minute, are possible because of the recycling of the aeration gas which makes condensation of the volatile vapors (alcohol, acid) possible.

According to a variant of the process, the substrate containing the microorganisms of the Acetobacter type is put in contact with solid microparticles, with a particle size on the order of about a hundred microns, compatible with an alimentary usage, of the clay, bentonite, montmorillonite type. The Acetobacter bacteria have the property of being absorbed on this microsupport forming particles sufficiently small to be kept in suspension, but nevertheless decanting rather quickly to make their retention possible.

An installation that, for the overall device, makes possible a continuous operation comprises at least two fermentors mounted in series, connected by a pipe where gas and liquid alternately or simultaneously circulate, a device for supplying substrate for the first fermentor, and at least an intermediate supply of substrate for the other fermentors, an aeration device located in the lower part of each fermentor, a gas-liquid separator, a line for recirculation of the aeration gases to which a recirculation device and an oxygen entry are connected. This installation, represented in the figure of the accompanying drawing, comprises three fermentors 2, 3 and 4 mounted in series. Supplying of substrate (1) takes place on the first reactor (2). Its aeration comes from the recycled gas (8) possibly enriched with oxygen (11). The fermentors are connected two by two (2 and 3) (3 and 4) by a pipe (12) and (13) where gas and liquid alternately or simultaneously circulate. The aeration of each fermentor is provided by the gas emitted by an aeration device located at the lower part of the fermentor, and consisting of a perforated ramp or a porous plate (11a, 11b, 11c). At the end of the installation, a gas-liquid separator (9) makes it possible to recover the liquid effluent from the fermentors by the output (10) on which a carbon dioxide controller (not shown) on the effluent by automatic triggering is connected. The gas-liquid separator (9) makes possible the recovery and the recycling of the fermentation gas slightly charged with $CO_2$, a fan (7) provides the recirculation of the aeration gases. Between two fermentors (1 and 2) and (2 and 3) are additional supplies (5 and 6) of substrate connected to the pipe (12 and 13) connecting two fermentors.

Several examples of acetic acid production are given below.

EXAMPLE 1

A solution comprising Actobacter xylinum is put in contact with solid microparticles of montmorillonite with a concentration of 25 g/l in a fermentor of the bubble column type, thermoregulated to 28° C., equipped with a decanter supplied with wine or alcohol at 100 g/l. For the strain used, the maximum rate of production (3, 4 g./l. hr.) is obtained for a dilution of 0.055 $h^{-1}$; the concentration of acetic acid is then 60 g/l in the outgoing liquid. With an aeration of 0.8 to 1 vvm, the efficiency of conversion of alcohol into acid can reach 92%, the gas being partially recycled with a renewal level of 0.2 vvm.

EXAMPLE 2

Under the same conditions as before, the aeration gas (1 vvm) is totally recycled. The necessary addition of oxygen is supplied by pure oxygen. The efficiency of $O_2$ usage is 99.5%.

EXAMPLE 3

So as not to inhibit the growth of the Acetobacter xylinum strain in the fermentor, it is supplied with a substrate whose alcohol concentration does not exceed 60 g/l. Under these conditions, a cellular concentration two times greater than that of standard continuous fermentation (0.75 g/l dry weight) is obtained when the content of residual ethanol does not exceed 5 g/l. With a dilution level of the substrate of 0.12 $h^{-1}$, the productivity of acetic acid is 7 g l/hr, the concentration of acetic acid is 58 g/liter with 4 g/l of residual ethanol.

EXAMPLE 4

In a two-stage system, the fermentation is performed in two stages of 0.5 liters each, the dilution level is 0.02 $h^{-1}$, the alcohol concentration of the supply of substrate being 60 g/l, with total recycling of the aeration gas and addition of oxygen with pure oxygen and additional substrate with an alcohol concentration of 60 g/l. The cellular concentration of the first stage is 0.7 g/l, that of the second stage 0.085 g/l. The cellular concentration at the output of the first stage is 64 g/liter and at the output of the second stage 96 g/liter.

EXAMPLE 5

In an installation of the type shown in the figure, a continuous fermentation is performed in three separate stages of 0.33 liters each, with a substrate having an alcohol concentration of 60 g/l, a dilution level of 0.02 $h^{-1}$, comprising Acetobacter xylinium. The cellular concentrations in the three fermentors in series are respectively as follows: first fermentor: 0.169 g/l; second fermentor: 0.111 g/l; third fermentor; 0.050 g/l. The concentration of acetic acid at the output of the first fermentor is 55.7 g/l, it rises to 92.5 g/l at the output of the second, and reaches 109.3 g/l at the output of the third fermentor, the productivity is 2.2 g/l.

While certain specific embodiments have been disclosed in the foregoing descripion, it will be understood that various modifications within the scope of the invention may occur to those skilled in the art. Therefore, it is intended that adaptions and modifications should and are intended to be comprehended with the scope of the appended claims.

We claim:

1. A process comprising at least two stages for the continuous production of vinegar by microbiological conversion of ethanol substrate into acetic acid comprising:
   a first stage comprising microbiologically converting ethanol into acetic acid in the presence of air to consume oxygen in the air;
   measuring the amount of oxygen in the completed first stage;
   a second stage comprising adding oxygen as an aeration gas to the first stage as required by the conversion process to form a superoxygenated atmosphere;
   recycling the aeration gas;

expelling the aeration gas as shown as the carbon dioxide content thereof reaches a threshold value of 7%;

closing the recycling circuit and reconstituting the superoxygenated atmosphere with pure oxygen.

2. The process of claim 1 wherein the concentration of the ethanol substrate is between about 60 and 100 grams per liter.

3. The process of claim 1 wherein the amount of oxygen in the first stage is measured by measuring partial vacuum.

4. The process of claim 1 wherein the amount of oxygen in the first stage is measured by measuring dissolved oxygen.

5. The process of claim 1 wherein at least two microbiological conversions are performed in at least two fermentation stages with at least one additional supply of substrate.

6. The process of claim 1 wherein the level of carbon dioxide in the aeration gas is controlled automatically.

7. The process of claim 1 wherein the microorganisms used for the fermentation are of the Acetobacter type and the microorganisms are adsorbed on microparticles selected from the group consisting of clay, bentonite, and montmorillonite.

8. The process of claim 2 wherein at least two microbiological conversions are effected in at least two fermentation stages with at least one additional supply of substrate.

9. The process of claim 3 wherein at least two microbiological conversions are effected in at least two fermentation stages with at least one additional supply of substrate.

10. The process of claim 2 wherein the microorganisms are of the Acetobacter type and are adsorbed on solid microparticles selected from the group consisting of clay, bentonite, and montmorillonite.

11. The process of claim 3 wherein the microorganisms are of the Acetobacter type and are adsorbed on solid microparticles selected from the group consisting of clay, bentonite, and montmorillonite.

12. The process of claim 6 wherein the microorganisms are of the Acetobacter type and are adsorbed on solid microparticles selected form the group consisting of clay, bentonite, and montmorillonite.

13. The process of claim 7 wherein the microorganisms are of the Acetobacter type and are adsorbed on solid microparticles selected from the group consisting of clay, bentonite, and montmorillonite.

14. The process of claim 1, wherein in a two-stage process the dilution level of the substrate is between 0.01 to 0.1 $h^{-1}$ and in a three-stage process between 0.01 and 0.122 for an ethanol substrate having an alcohol concentration of about 100 g/l.

15. The process of claim 2, wherein in a two-stage process the dilution level of the substrate is between 0.01 to 0.1 $h^{-1}$ and in a three-stage process between 0.01 and 0.122 for an ethanol substrate having an alcohol concentration of about 100 g/l.

16. The process of claim 3, wherein in a two-stage process the dilution level of the substrate is between 0.01 to 0.1 $h^{-1}$ and in a three-stage process between 0.01 and 0.122 for an ethanol substrate having an alcohol concentration of about 100 g/l.

17. The process of claim 4, wherein in a two-stage process the dilution level of the substrate is between 0.01 to 0.1 $h^{-1}$ and in a three-stage process between 0.01 and 0.122 for an ethanol substrate having an alcohol concentration of about 100 g/l.

18. The process of claim 6, wherein in a two-stage process the dilution level of the substrate is between 0.01 to 0.1 $h^{-1}$ and in a three-stage process between 0.01 and 0.122 for an ethanol having an alcohol concentration of about 100 g/l.

* * * * *